United States Patent Office 3,136,772
Patented June 9, 1964

3,136,772
THENYL QUATERNARIES OF CERTAIN THIAZOLE INTERMEDIATES FOR CYANINE DYES
Henry G. Derbyshire, Chenango Forks, N.Y., assignor to General Aniline & Film Corporation, New York, N.Y., a corporation of Delaware
No Drawing. Filed Feb. 8, 1957, Ser. No. 638,924
3 Claims. (Cl. 260—302)

The present invention relates to cyclammonium salts in which the heterocyclic nitrogen atom contains an α-thienylmethyl group, sensitizing dyes derived therefrom, and silver halide emulsions sensitized with such dyes.

The reaction of alkylating agents, e.g., alkyl halides, with heterocyclic nitrogenous bases to produce quaternary salts useful as intermediates for the preparation of sensitizing dyes has long been known to the photographic art.

It has now been discovered that new and valuable sensitizing dyes can be obtained from cyclammonium salts having an α-thienylmethyl group on the quaternary nitrogen atom. These quaternary salts can be reacted with cyclammonium quaternary salts containing a reactive group on the α-carbon atom to produce, inter alia, mono- or polymethine cyanine dyes which are powerful sensitizers for silver halide emulsions.

Said cyclammonium salts, their preparation, dyes derived therefrom and silver halide emulsions sensitized with said dyes constitute the purposes and object of my invention.

The cyclammonium salts contemplated herein are readily prepared by reacting any heterocyclic base usual in preparing cyanine dyes, e.g., quinoline, benzothiazole, naphthothiazole, thiazoline, thiazole, benzoselenazole, benzoxazole, indolenine, pyridine, benzimidazole, and the like with α-thienylmethyl halide, e.g., α-thienylmethyl bromide, and isolating the resulting quaternary salts in the usual manner.

The new cyclammonium salts may be represented by the following general formula:

(I)
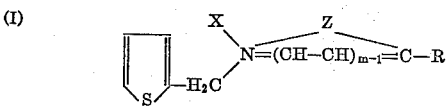

wherein $m$ is an integer of from 1 to 2, Z represents the non-metallic atoms necessary to complete a 5- or 6-membered heterocyclic ring of the type commonly encountered in cyanine dyes, such as quinoline, benzothiazole, naphthothiazole, thiazoline, thiazole, benzoselenazole, benzoxazole, indolenine, pyridine, benzimidazole and the like, R is alkyl such as methyl, ethyl, propyl, butyl, and the like; aralkyl, i.e., benzyl, phenethyl and the like; and alkylmercapto group, i.e., methylmercapto, ethylmercapto, propylmercapto, and the like; an arylmercapto group, i.e., phenylmercapto, α-naphthylmercapto, and the like; and X is an anion such as a halide, alkylsulfate, or a p-toluenesulfonate.

The cyclammonium salts formulistically represented above may be converted to sensitizing dyes having the following general configuration:

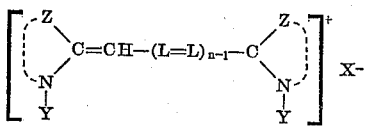

using techniques well known to the art, such as heating said salts in the presence of acid binding agents such as pyridine, triethylamine, and the like with a cyclammonium quaternary salt containing a reactive group on the carbon atom at the 2- or 4-position of the heterocyclic ring such as a halogen atom, i.e., chlorine, bromine, or the like, a thioether group, a thioketo group, a β-anilino vinyl group, or the like.

In the above general formula for the sensitizing dyes, Y is alkyl such as ethyl, methyl, propyl, butyl, etc., aralkyl, i.e., benzyl, phenethyl, etc., carboxyalkyl such as carboxyethyl, carboxypropyl, etc., or α-thienylmethyl, at least one Y being α-thienylmethyl, L is a methine group, i.e., =CH—CR″=, wherein R″ represents alkyl, i.e., methyl, ethyl, propyl, etc., Z represents the non-metallic atoms necessary to complete a 5- or 6-membered heterocyclic ring of the type commonly encountered in cyanine dyes such as quinoline, benzothiazole, naphthothiazole, thiazoline, thiazole, benzoselenazole, benzoxazole, indolenine, pyridine, benzimidazole, and the like, X is an anion as above, and $n$ represents a whole number from 1 to 8.

This invention is illustrated in greater detail by the following examples although it is to be understood that said examples in no way restrict the present invention.

EXAMPLE I

α-Trienylmethyl Bromide

α-Thienylmethyl bromide is prepared by an adaptation of a method described in JACS, vol. 70, 42–48 (1948), which is as follows:

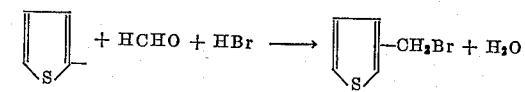

40 grams thiophene and 34 mls. 48% HBr were mixed together at 5–10° C. With vigorous stirring during the course of ½ hour, 50 mls. of 37% formaldehyde (H₂O) were added. The mixture was stirred ½ hour longer at 5–10° C. The cloudy white yellow oil was ether extracted with three 50 ml. portions of ether. The ether extracts were combined, washed with water, then sodium bicarbonate solution, and finally dried over anhydrous sodium sulfate. After solvent evaporation, the brown oil residue was distilled at reduced pressure. The fraction boiling at 65–90° C. at 4–8 mm. pressure was collected and used in the subsequent quaternation reactions.

EXAMPLE II

2,4-Dimethyl-3-(α-Thienylmethyl)Thiazolium Bromide

The 4 ml. fraction of α-thienylmethyl bromide from Example I was mixed with 5 mls. of 2,4-dimethylthiazole, and the resulting solution was allowed to stand at room temperature overnight. The tan crystalline solid was triturated with ether, filtered, washed with ether, and then used immediately in the dye synthesis.

EXAMPLE III

3 - Ethyl - 4′,5,6 - Trimethyl - 3 - (α - Thienylmethyl) Oxathiazolocarbocyanine Iodide

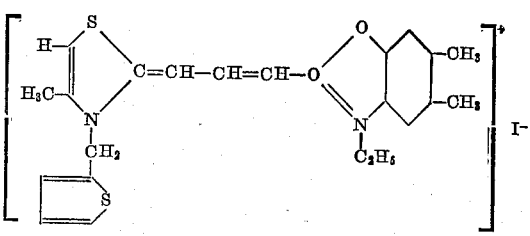

1.0 gram of the above prepared thiazolium salt from Example II, and 1.3 grams 2-(β-acetanilidovinyl)-3-ethyl-5,6-dimethylbenzoxazolium iodide were stirred together in 20 mls. of isopropyl alcohol. The system was heated to boiling with constant agitation and 1 ml. triethylamine was added. Boiling and stirring were continued until all the starting materials were dissolved; then the reaction vessel was allowed to cool slowly to room temperature. Brassy metallic crystals of dye separated on the walls of the tube. The product was removed by filtration, washed with cold isopropyl alcohol, and recrystallized from 70 mls. hot methyl alcohol.

The melting point was 220–223° C., and the absorption maximum in methanol was 524 m$\mu$.

The dye, when coated in a gelatin silver halide emulsion, extended the range of sensitization to 590 m$\mu$ with a strong maximum at 555 m$\mu$. The presence of the α-thienylmethyl substituent increases sensitizing efficiency of this dye. Simple alkyl substituted dyes sensitize the same emulsion 50–100% less. The α-thienylmethyl group also causes a bathochromic shift in dye absorption when substituted for a methyl group.

EXAMPLE IV

*3,3'-Di(α-Thienylmethyl) Thiacarbocyanine Bromide*

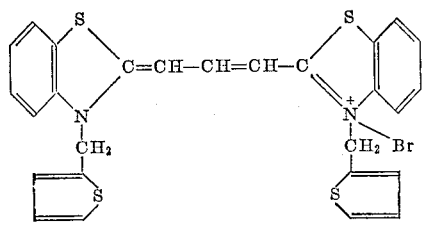

14.9 grams of 2-methylbenzothiazole and 17.7 grams of α-thienylmethyl bromide were stirred together on a steam bath for 20 minutes after which time a yellow solid had formed. The product was then dissolved in iso-propyl alcohol. On cooling to 0° C., white crystals of the α-thienylmethyl quaternary salt were obtained; yield 18.0 grams.

2.0 grams of the above 2-methyl-α-thienylmethylbenzothiazolium bromide, 5 mls. of ethyl orthoformate and 10 mls. of pyridine were refluxed for 2 minutes. At the end of this time, purple crystals of dye with a metallic reflex had separated out on the walls of the reaction vessel. The crude dye was filtered off, washed free of pyridine with cold iso-propyl alcohol and crystallized from 100 mls. of methyl alcohol. The crystallized dye was filtered, washed with dry ether and dried at 65° C. The melting point was 220–223° C.

EXAMPLE V

*9 - Ethyl - 3 - Methyl - 3' - (α-Thienylmethyl) - 4,5-Benzothiacarbocyanine Iodide*

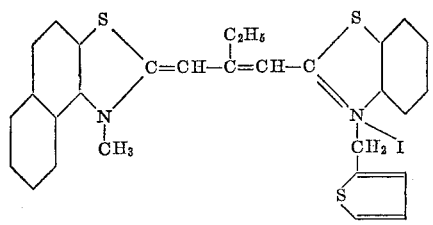

0.65 gram of 2-methyl-3-(α-thienylmethyl) benzothiazolium bromide, prepared according to Example IV, and 0.86 gram of 2-[2-(methylthio)-2-butenyl] naphtho [2,1] thiazolium iodide were dissolved in 10 mls. of boiling isopropyl alcohol. 2 mls. of triethylamine were next added and the mixture boiled vigorously until a considerable quantity of metallic dye crystals had formed on the walls of the reaction vessel. After cooling to 0° C., the crude dye was filtered off, washed with water, then ether and boiled up with 250 mls. of methyl alcohol and filtered hot to remove an insoluble product. The dye solution was treated with an equal volume of 2% aqueous potassium iodide solution and the resulting flocculent dye precipitate was filtered off, washed with water, ether, then isopropyl alcohol and dried at 64° C.

The melting point of the dye was 197–200° C.

EXAMPLE VI

*3,9-Diethyl-5-Methoxy-3'-(α-Thienylmethyl) Selenathiacarbocyanine Iodide*

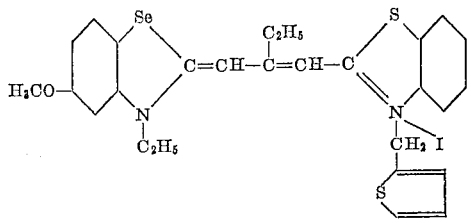

0.65 gram of 2-methyl-3-(α-thienylmethyl) benzothiazolium bromide and 0.75 gram of 3-ethyl-5-methoxy-2-[2-(methylthio) - 1 - butenyl] benzoselenozolium iodide were stirred up in 20 mls. of boiling iso-propyl alcohol. 2 mls. of triethylamine were next added and the resulting purple solution was heated at the boil for 5 minutes during which time crystals having a green reflux separated out in the walls of the reaction vessel. After cooling 15 minutes to room temperature with constant stirring, the solid was filtered off and then boiled up with 250 mls. of methyl alcohol. The boiling solution was filtered and the residue discarded. The filtrate was evaporated to a volume of 100 mls. and cooled to −5° C. The dye crystals which separated out were filtered off, washed with ether, and dried at 65° C. The melting point of the dye was 195–198° C.

EXAMPLE VIII

*5-Chloro-3-Ethyl-4'-Methyl-3'-(α-Thienylmethyl) Oxathiazolocarbocyanine Iodide*

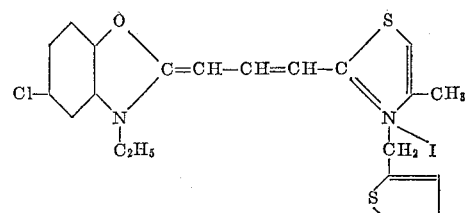

0.25 gram of 2,4-dimethyl-3-(α-thienylmethyl) thiazolium iodide, and 0.25 gram of 2-β-acetanilidovinyl-5-chloro-3-ethylbenzoxazolium iodide were refluxed in 5 mls. of iso-propyl alcohol. Ten drops of triethylamine were next added, resulting in the immediate formation of a pink solution. The reaction mixture was boiled 1 minute with stirring and then allowed to cool to room temperature while maintaining agitation. The orange-pink crystals which had come down shortly after heating were then centrifuged. The solid was triturated with cold acetone, filtered and then recrystallized from 10 mls. of methyl alcohol. The yield of dye melting at 216–218° C. amounted to 50 milligrams.

I claim:
1. A sensitizing dye intermediate of the following formula:

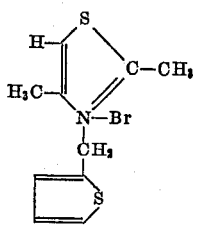

2. A sensitizing dye intermediate of the following formula:

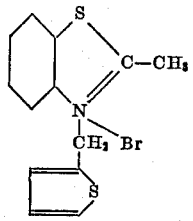

3. A sensitizing dye intermediate selected from the group consisting of those having the following formulae:

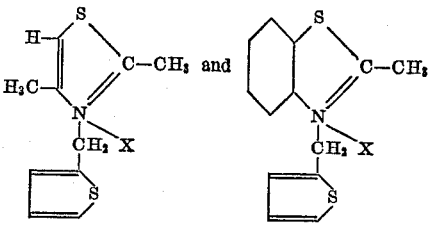

wherein X is an anion.

References Cited in the file of this patent

UNITED STATES PATENTS

| | | |
|---|---|---|
| 2,231,659 | Brooker et al. | Feb. 11, 1941 |
| 2,471,091 | Campaigne et al. | May 24, 1949 |
| 2,548,898 | Kyrides | Apr. 17, 1951 |
| 2,603,642 | Edwards et al. | July 15, 1952 |
| 2,756,227 | Heseltine | July 24, 1956 |

FOREIGN PATENTS

| | | |
|---|---|---|
| 455,308 | Canada | Mar. 22, 1949 |